United States Patent [19]

Skinner et al.

[11] Patent Number: 5,201,233

[45] Date of Patent: Apr. 13, 1993

[54] RETAINER ASSEMBLY WITH DISHED RETAINING RING

[75] Inventors: Timothy J. Skinner, East Amherst; George T. Bennett, Williamsville, both of N.Y.

[73] Assignee: General Motors Corporation, Detroit, Mich.

[21] Appl. No.: 827,676

[22] Filed: Jan. 29, 1992

[51] Int. Cl.$^5$ .................. F16H 23/08; F04B 1/16; F16B 21/18

[52] U.S. Cl. .................................. 74/60; 267/161; 384/620; 384/903; 403/326; 403/DIG. 7; 411/518; 411/544

[58] Field of Search .............. 74/60; 92/12.2, 71; 384/903, 620; 267/161; 403/326, DIG. 7; 411/517, 518, 519, 544; 417/222 S

[56] References Cited

U.S. PATENT DOCUMENTS

| | | | |
|---|---|---|---|
| 2,487,802 | 11/1949 | Heimann | 411/518 |
| 2,544,631 | 3/1951 | Heimann et al. | 411/518 |
| 3,186,352 | 6/1965 | Anderson | 417/222.1 X |
| 3,304,886 | 2/1967 | Roberts | 417/222.1 |
| 4,019,342 | 4/1977 | Ohta | 417/372 X |
| 4,428,718 | 1/1984 | Skinner | 417/222 S |
| 4,820,132 | 4/1989 | Higashihara et al. | 417/222 S |

FOREIGN PATENT DOCUMENTS 3638000  5/1987  Fed. Rep. of Germany .

*Primary Examiner*—Allan D. Herrmann
*Attorney, Agent, or Firm*—Ronald L. Phillips

[57] ABSTRACT

A wobble plate compressor includes a non-rotary socket plate mounted on a journal of a rotary drive plate. The drive plate includes a bushing and a needle-type thrust bearing to accommodate relative rotary movement between the plates. The socket plate and drive plate are retained together by an assembly including a square-edged annular channel formed in a recessed journal, a thrust washer for engaging the journal and the bushing and a dished retaining ring. The dished retaining ring also includes square edges mating with the adjacent sides of the channel. The retaining ring engages the thrust washer so as to provide a preload force to seat the washer on the journal and for biasing the socket plate against the thrust bearing. The retaining ring is characterized by a three degree dish angle when compressed between two flat parallel surfaces with an applied load of 30 N.

9 Claims, 2 Drawing Sheets

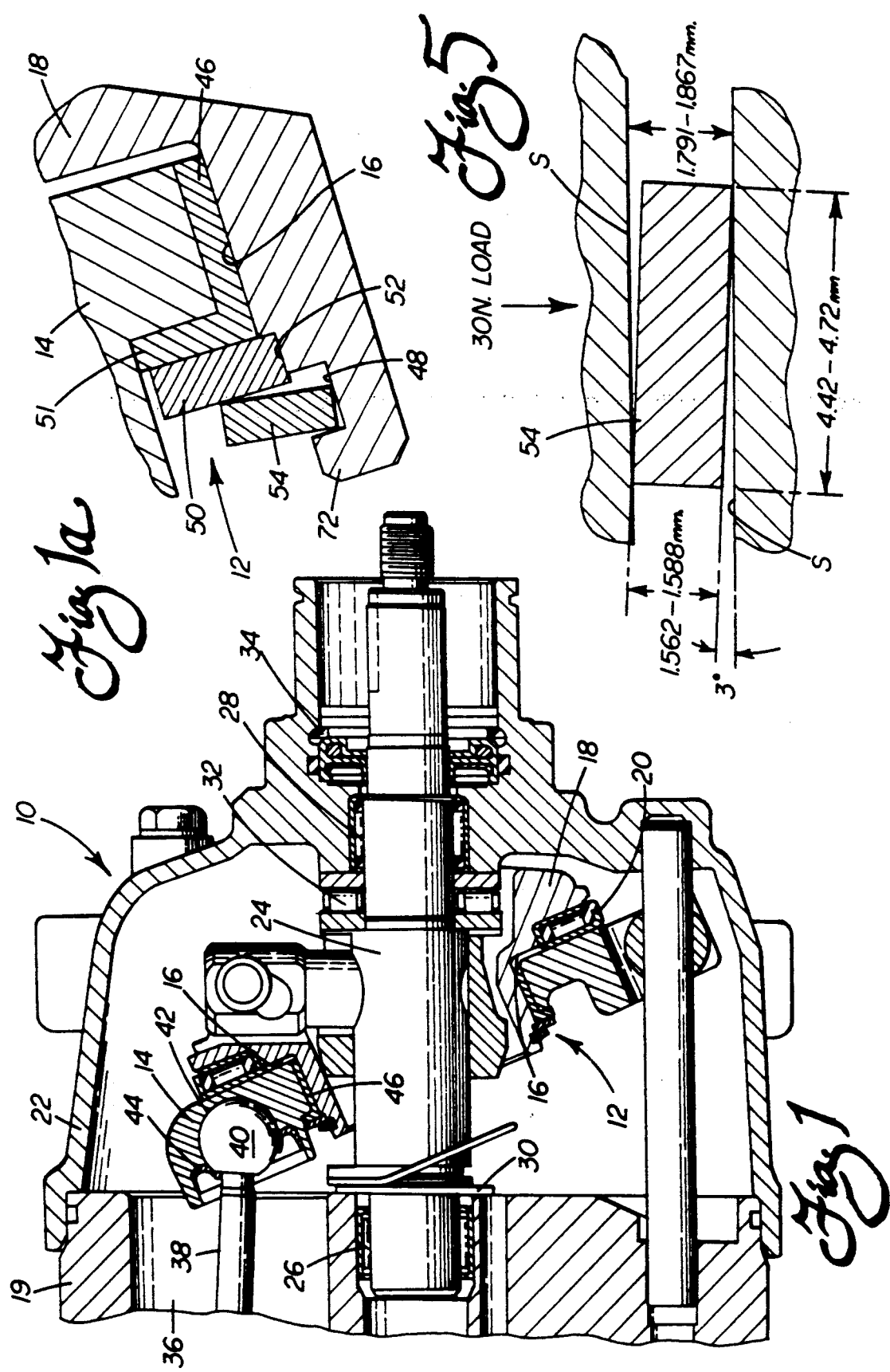

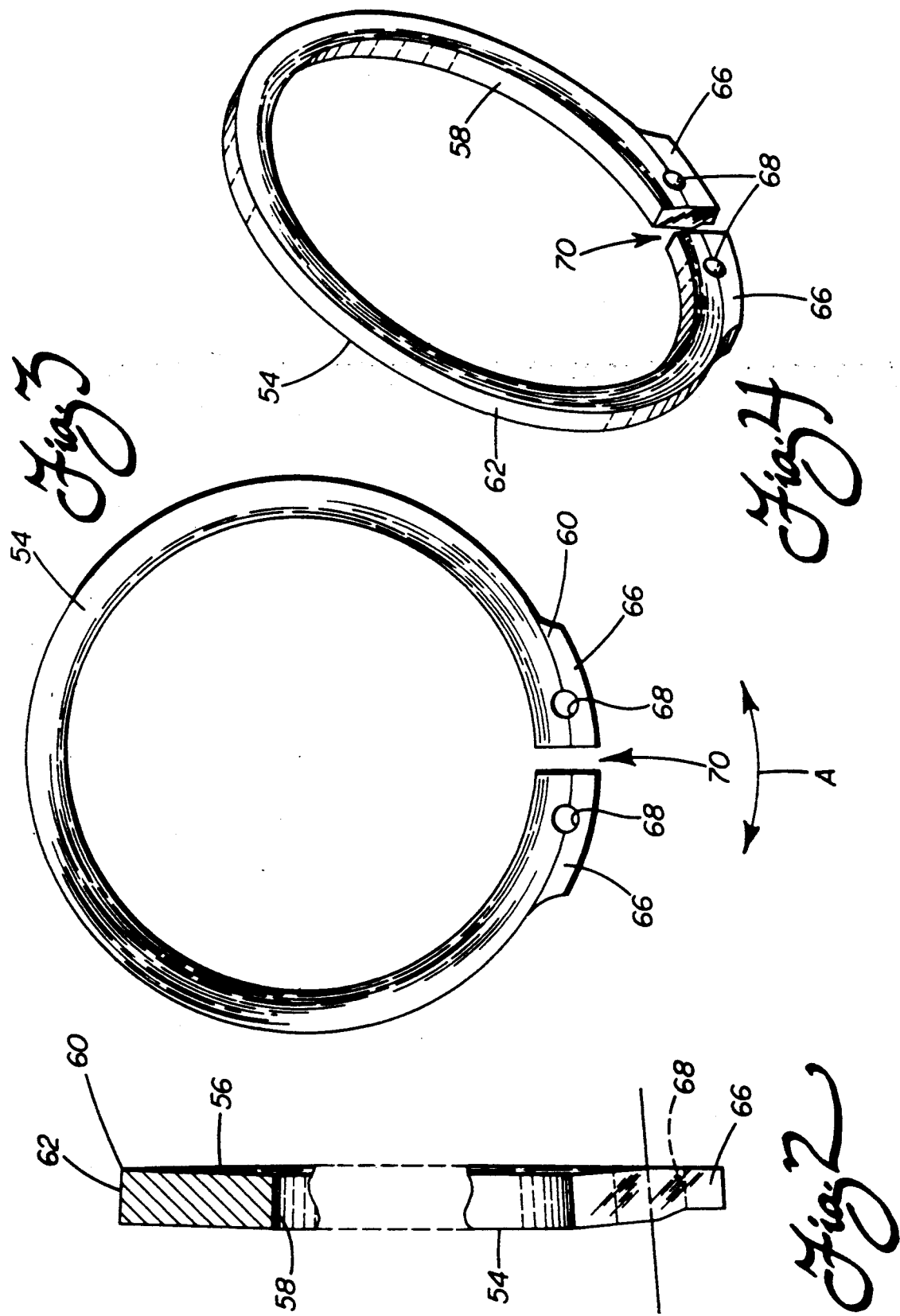

RETAINER ASSEMBLY WITH DISHED RETAINING RING

TECHNICAL FIELD

This invention relates generally to wobble plate refrigerant compressors, such as utilized in automotive air conditioning systems and, more particularly, to a retainer assembly for the socket plate of the wobble plate assembly.

BACKGROUND OF THE INVENTION

A popular type of refrigerant compressor for use in automotive air conditioning systems includes a wobble or nutating drive mechanism. Such a compressor may either be designed for constant or infinitely variable displacement. In either design of this type, a plurality of cylinders are equally angularly spaced about a cylinder block and compressor housing, and equally radially spaced from the axis of a central drive shaft. A piston is mounted for reciprocating motion in each of the cylinders. A piston rod connects each piston to a non-rotatable socket plate of the wobble plate assembly. This socket plate provides the nutating motion in response to a drive plate that is attached to the drive shaft. The driving of the socket plate in a nutating path serves to impart the linear reciprocating motion to the pistons, thereby providing proper compressor operation.

The drive plate includes a recessed journal that receives a bushing by which the socket plate is held in place. The drive plate also includes a thrust bearing of the needle type mounted in the journal to reduce the friction at the rotary interface of the journal. The angle of both the socket plate and the drive plate with the thrust bearing in between is always the same relative to the drive shaft. The stroke of the pistons, and accordingly the displacement or capacity of the compressor, is in effect a function of this angle. As the drive plate rotates, the bushing and thrust bearing allow the socket plate to be held against rotation, but forced to travel in the nutating path.

In variable displacement wobble plate compressors, the angle of the socket plate and the associated thrust bearing and bushing is adjustable to control the displacement or capacity of the compressor. When the axis of the socket plate is substantially coincident with the axis of the central drive shaft, the compressor is operating at zero compression or zero stroke. When the axis of the socket plate is at its extreme allowable angle relative to the axis of the drive shaft, the compressor is operating at full compression or full stroke. It can be further appreciated that the stroke of the pistons is infinitely adjustable between the zero stroke and full stroke positions, as the socket plate pivots from the axial coincidence with the drive shaft to the extreme position.

In order to provide for ease of compressor assembly, it has long been known to retain the socket plate in position on the journal of the drive plate through the utilization of a snap-type retaining ring. As disclosed in, for example, U.S. Pat. No. 4,428,718 to Skinner, entitled "Variable Displacement Compressor Control Valve Arrangement", issued Jan. 31, 1984 and assigned to the assignee of the present invention, the inner peripheral edge or margin of the retaining ring is received in an annular groove or channel formed in the journal. The inside face of the outer peripheral edge of the retaining ring engages a thrust washer that is in juxtaposition with the associated bushing that holds the socket plate in place on the journal.

In past practice the retaining ring has included a formed angle on the outside face. This angle matches the angle of the mating side wall of the annular channel. Accordingly, when properly positioned, the retaining ring acts as a wedge to provide for a biasing function. This feature is intended to compensate for manufacturing tolerances to provide a proper fitting assembly. As a result, the bias force provided preloads the thrust washer and bearing against the journal. This results in smooth, chatterless operation, and a reduction in noise generated during high-speed rotation of the drive plate.

While this prior art approach does provide for ease of assembly and significant noise reduction during compressor operation, further improvement in this basic design is desired. More specifically, it has been found that the performance of the prior art retaining ring degrades slowly over time. This is particularly true in vehicles operated in geographical areas experiencing hot and humid weather conditions for extended periods of time. The air conditioning systems in such vehicles are often subjected to high load operating conditions that place significantly higher strain upon the compressor.

As the performance of the retaining ring degrades, a loss of preload force results. Eventually, the preload force drops to a level where sufficient biasing of the thrust washer against the journal is no longer provided to maintain noise free operation. This is a significant annoyance to the passengers in the vehicle as the noise is transmitted through the air conditioning system directly into the passenger compartment. Further, excessive play between the socket plate and the drive plate eventually develops. This promotes the generation of troublesome vibrations and accelerated wear that reduces the service life of the compressor.

Efforts to address the problem by adjusting the formed angle of the retaining ring and annular channel have met with only limited success. More particularly, some improvement in durability is provided but the problem still persists to a lesser degree. Accordingly, other approaches to improve the durability of the retainer assembly while maintaining the ease of production and assembly of component parts are needed, and even recognized by others. One such approach is disclosed in U.S. Pat. No. 4,820,132 to Higashahira et al. entitled "Variable Displacement Wobble Plate Type Compressor" issued on Apr. 11, 1989. In this design, a plate spring is provided to constantly bias the socket plate against the thrust bearing. The retainer/spring are rotatably locked into a biasing position. The plate spring, retainer and thrust washer are all required. The spring is received in a groove or channel in the journal of the drive plate, but is not directly engaged therein.

While this system is also effective, it too suffers certain drawbacks and is not the ultimate answer. More particularly, matching crenulations or arcuate projections and recesses must be formed in the various components of the retainer assembly to ensure that the retainer/spring does not vibrate out of the desired rotary position thereby leading to a drop in the preload force, production of noise and the presence of excessive play. Further, painstaking steps must be taken to ensure and confirm proper installation and the locking of the rotatable parts in position. Such time consuming steps are inconvenient and expensive. The need therefore exists for the present improved assembly for retaining the socket plate on the drive plate of a wobble plate compressor.

SUMMARY OF THE INVENTION

Accordingly, it is a primary object of the present invention to provide an improved retainer assembly for utilization in a wobble plate compressor overcoming the above-described limitations and disadvantages of the prior art.

Another object of the present invention is to provide a wobble plate compressor with an improved assembly, for retaining a non-rotary socket plate on a journal of a rotary drive plate, that is relatively inexpensive to produce and allows ease of assembly of the component parts.

Another object of the present invention is to provide a retainer assembly of the type described that maintains the desired preload force to minimize noise generation during compressor operation and eliminate excessive play that would otherwise result in rapid wear and eventual failure of the compressor.

Still another object of the present invention is to provide a variable displacement compressor incorporating an assembly for retaining a non-rotary socket plate on a journal of a rotary drive plate providing more reliable performance. More particularly, the desired preload force for biasing the thrust washer against the journal and the socket plate against the thrust bearing on the journal is maintained at the desired level to provide smooth operation of the compressor over a longer service life. This is advantageously accomplished without introducing a frictional force sufficiently high to significantly degrade compressor operating life or efficiency.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a retainer assembly is provided in a wobble plate compressor having a non-rotary socket plate mounted on a recessed journal of a rotary drive plate. The journal includes a bushing and thrust needle bearing to accommodate relative rotary movement between the plates.

The retainer assembly includes an annular channel formed in the drive plate/journal and a thrust washer for engaging the bushing. A dished retaining ring is received in the annular channel and engages the thrust washer to provide a preload force. This force constantly biases or urges the thrust washer against the journal and the socket plate against the thrust bearing to thereby reduce noise and provide smoother operation during rotary motion of the drive plate.

The dished retaining ring is of a Belleville type and characterized by a three degree dish angle when compressed between two flat parallel surfaces with an applied load of approximately 30N (newtons). Preferably, the retaining ring includes a dished portion extending from an inner peripheral edge of the retaining ring uniformly outward to the outer peripheral edge. Alternatively, the dished portion can extend outwardly along equal radial lines only part way, and to where a thinner section is formed and the ring flattens out. A tangent drawn to any portion of the outer edge of the dished portion of the ring defines the inner limit of the flattened, thin circumferential section. The flat section extends from the tangent lines to the outer peripheral edge of the retaining ring.

In either embodiment, the retaining ring is split and includes installation ears extending beyond the dished portion. The ears are formed as flattened extensions. This prevents excessive stress from building under loaded conditions thereby improving the reliability and durability of the retaining ring. Apertures in the ears are provided to receive a spanner wrench (not shown) for installation.

It is also preferred for both the retaining ring and the annular channel to be machined to include square edges. The inner peripheral edge of the retainer ring directly engages and provides maximum frictional engagement with the channel and, therefore, reliable retention of the component parts while maintaining the desired preload force to ensure smooth compressor operation. Likewise the outer, squared-off edge of the ring engages the thrust washer for the same result. In both areas, there is line contact to concentrate and increase the holding force.

The amount of preload force provided by the dished retaining ring is determined by a number of factors including the ring material, the ring thickness, the relative width of the dished portion of the ring, the dish angle formed in the ring and the annular line of interference between the free or outer side of the ring and the annular channel. In accordance with the preferred embodiment of the invention, the dished retaining ring is 4.42–4.72 mm wide and has an actual material thickness in section of 1.562–1.588 mm. The effective thickness due to the dishing under the force of 30N and at the 3 degree dish angle is between 1.791 and 1.867 mm. The goal is to provide a preload force in the range of 1000–7000 Newtons which was found sufficient to eliminate play between the socket plate and drive plate in the axial direction due to manufacturing tolerances and dynamic loads. As installed, the ring assumes a substantially flat to relatively small angular condition (0.17 mm deep dish). In this way quieter operation is provided and excessive wear from otherwise uncontrolled vibrations is virtually eliminated. Conversely, the preload force provided is not so strong as to create excessive friction between the socket plate and drive plate that would result in operating inefficiency and the generation of heat that could, over time, damage components of the compressor system.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing:

FIG. 1 is a cross-sectional side view of the crankcase end of a variable displacement compressor showing the relative position of the socket plate and drive plate of the wobble plate assembly;

FIG. 1a is a detailed fragmentary sectional view of the retainer assembly of the wobble plate assembly in the compressor of FIG. 1;

FIG. 2 is a detailed cross-sectional view of the dished retaining ring of the present assembly;

FIG. 3 is a front elevational view of the retaining ring;

FIG. 4 is a perspective view of the retaining ring; and

FIG. 5 is a detailed cross-sectional view showing the dish angle of the retaining ring when compressed between two flat parallel surfaces with an applied load of 30N.

Reference will now be made in detail to the present preferred embodiment of the invention, an example of which is illustrated in the accompanying drawing.

DETAILED DESCRIPTION OF THE INVENTION

Reference is now made to FIG. 1 showing the crank case end of a wobble plate compressor 10 including the improved assembly 12 for retaining a socket plate 14 in operative position on a recessed journal 16 of a drive plate 18. Advantageously, the retainer assembly 12 provides a desired level of biasing to urge the thrust washer against the journal 16, and the socket plate 14 against a thrust bearing 20, also on the journal of the drive plate 18. As described in greater detail below this urging ensures the smooth operation of the compressor 10 to provide a number of advantages, including a reduction in noise generation and the elimination of excessive play and vibrations that could deleteriously affect the integrity of the component parts and the operation of the compressor over time.

As shown, the wobble plate compressor 10 includes a cylinder block 19. As is known in the art and shown in, for example, U.S. Pat. No. 4,428,718 to Skinner, referenced above, the cylinder block has a head (not shown) and a crank case 22 sealingly clamped to opposite ends thereof.

A drive shaft 24 is supported centrally in the compressor 10 by the cylinder block 19 and crank case 22 by radial needle bearings 26 and 28, respectively. The drive shaft 24 is axially retained by a thrust washer 30 inward of the radial needle bearing 26 and a thrust needle bearing 32 inward of the radial needle bearing 28. It extends through the crank case 22 for connection to an automotive engine (not shown) by an electromagnetic clutch and pulley (not shown). As is known in the art, a seal 34 is mounted on the crank case 22 to prevent escape of the refrigerant and lubricant.

The cylinder block 19 usually includes five, six or seven axial cylinders 36 extending therethrough (only one is shown). The cylinders 36 are equally angularly spaced about and equally radially spaced from the axis of the drive shaft 24. The cylinders 36 extend parallel to the drive shaft 24 with a piston (only one piston rod 38 shown in figure) mounted for reciprocal sliding movement in each of the cylinders. The piston rod 38 connects the piston to the non-rotary, ring-shaped socket plate 14 received about the drive shaft 24. As shown, the piston rod 38 is connected to the wobble plate 14 by a spherical rod end 40 that is retained in a socket 42 by a snap ring 44.

The non-rotary socket plate 14 is mounted at its inner diameter on a bushing 46 that is concentrically received over the recessed journal 16 of the drive plate 18. As best shown in FIG. 1a, the bushing 46 and hence the socket plate 14 are held in operative position by the retainer assembly 12. More specifically, the retainer assembly 12 includes an annular groove or channel 48 that is machined in the journal 16. A thrust washer 50 is received in an outer annular recess 52 and is held against the bushing 46 and seated against the journal 16. A hardened steel, dished retaining ring 54, fabricated in accordance with teachings of the present invention, holds all the component parts of the retainer assembly together with the proper preload force to ensure smooth and efficient compressor operation.

More particularly, the retaining ring 54 has an inner peripheral edge or margin 58 that is received and directly engages in the annular channel 48. As shown in FIG. 1a, both the retaining ring 54 and annular channel 48 are preferably squared off. The peripheral sharp edge of the retaining ring 54 thus engage the side/bottom wall of the annular channel 48 along annular lines to concentrate the frictional force, and thus to ensure dependable retention. The outer edge or margin of the retaining ring 54 engages the thrust washer 50 along an annular line also.

Advantageously, only two components (the retainer ring 54 and the washer 50) are required for the entire retainer assembly 12. Indeed, the retainer ring may rotate to relieve stress if necessary, such as may be caused by the multi-angular forces of the piston rods 38. This is accomplished without any adverse effect on the retention or biasing capability of the assembly 12. Through face-to-face engagement of the washer 50 with the recess 52 and the outwardly extending peripheral flange 51 of the bushing 46, the socket plate 14 is accordingly effectively and efficiently held in its proper operative position on the journal 16 of the drive plate 18.

As best shown in FIGS. 2 and 5, the dishing of the retainer ring 54 is constant around its periphery to provide the uniform biasing force that serves to urge the thrust washer 50 against the seat in the recess 52 and the socket plate 14 against the thrust bearing 20. More specifically, the retaining ring 54 includes a dished portion 56 that extends at a constant angle from the inner peripheral edge 58 to the outer peripheral edge 60.

In the preferred embodiment, the dished portion 56 is between 4.42 and 4.72 mm wide and forms a three degree angle when compressed between two flat parallel surfaces S, S$^1$ with an applied load of 30N (newtons), as can be seen particularly in FIG. 5. Also, the retaining ring 54 is hardened steel and has an actual material thickness in a transverse direction of between 1.562 and 1.588 mm, but an effective thickness under this loading due to the dishing, of between 1.791 and 1.867 mm.

The goal is to provide a sufficient force to effectively bias the thrust washer against the shoulder of the recess 52 and the socket plate 14 against the thrust bearing 20 so that free play is effectively eliminated and any noise produced as a result of the rotation of the drive plate 18 is minimized. As a result, the transmission of compressor noise through the air conditioning system to the passenger compartment of the vehicle is satisfactorily reduced. Further, troublesome free play that could otherwise lead to vibrations increasing the wear on the component parts of the compressor 10 is substantially eliminated. This is done while avoiding the application of too high a biasing force that could lead to damage or distortion of other parts of the compressor 10. In particular, the preload force is determined to be sufficient enough to prevent play between the socket plate and drive plate but not so high as to distort the thrust bearing 50 or overstress the flange 72 of the drive plate, i.e., the structure defining the retaining ring groove 48. Further, it should be appreciated that the preload force applied by the dished retaining ring 54 does not degrade significantly over time. Moreover, the square edge retaining groove 48 prevents the retaining ring 54 from working its way out. Thus, as an added benefit, the service life of the compressor 10 is significantly increased.

It should also be appreciated that the installation of the retainer assembly 12 is a relatively simple matter. First, the bushing 46/51 and socket plate 14 are properly positioned on the journal 16 of the drive plate 18. Next, the thrust washer 50 is positioned in the annular recess 52 so as to overlap and abut against the bushing 46 and the recess 52. Next, a force is applied to seat the thrust washer 50 and bias the socket plate 14 and drive plate 18 together as the dished retaining ring 54 is positioned in the annular channel 48 of the journal 16.

To assist in this installation, as best shown in FIGS. 3 and 4, the retaining ring 54 is split and includes installation ears 66 at the ends. The installation ears 66 are extensions from the outer peripheral edge 62 and form a curved definition line 60. The ears are flat from the definition line 60 to the outer edge 62. This advantageously serves to reduce the stress placed on the retaining ring 54 under load conditions, since the ears 66 lie flat against the thrust washer 50 when installed. That is, the ring 54 is not subject to being cocked at an angle in the channel 48 due to the outward projection of the ears 66 since they lie in the same plane as the annular contact line of the outer peripheral edge 60 at their area of engagement. The retaining ring 54 maintains the desired biasing force under all operative conditions, and without reference to its rotational position since it is secured only by friction.

During installation, the apertures 68 in the ears 66 are engaged by a standard spanner wrench and the split 70 is forced open (note action arrows A in FIG. 3). More particularly, the dished retaining ring 54 is forced open and expanded sufficiently to allow the necessary clearance to pass over the projecting flange 72 at the end of the recessed journal 16 (see FIG. 1a). The dished portion 56 of the retaining ring 54 is then partially flattened as the split 70 in the ring is closed (by resilient memory). The ring 54 is forced down into the annular channel 48 and the square edges are brought into firm engagement with the walls thereof. The installation is thereby completed with the proper preload force being provided to seat the thrust washer 50 and urge the socket plate 14 against the thrust bearing 20, and without having to tediously match component parts, as in the prior art.

In summary, numerous benefits result from the employing the concepts of the present invention. As described above, the retainer assembly 12 is relatively easy to install and secure in position. Once the retaining ring 54 is properly engaged in the annular groove 48, the desired preload force for urging the thrust washer 50 into the seated position in recess 52, and the socket plate 14 against the thrust bearing 20, is continuously maintained. Quiet, trouble-free compressor operation is thereby ensured over an extended service life even under harsh operating conditions.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. For example, the dished portion of the ring 54 may extend only over an inner portion of the width (now shown). The annular portion outside the dished portion is flattened and lies in the same plane as the ears 66. All such modifications and variations are within the scope of the invention as determined by the appended claims when interpreted in accordance with breadth to which they are fairly, legally and equitably entitled.

We claim:

1. In a wobble plate compressor having a non-rotary socket plate mounted for relative rotation on a rotary drive plate, said drive plate further including a journal, a bushing and a thrust bearing to accommodate the relative rotary movement between the plates, an improved retainer assembly comprising:

an annular channel formed in said drive plate;

a thrust washer for engaging and holding said bushing against said socket plate; and a dished retaining ring received in said channel and engaging said thrust washer so as to press against said washer and provide a preload force biasing said thrust washer against said journal and said socket plate against said thrust bearing, to thereby reduce noise and provide smoother operation during rotary motion of said drive plate;

said dished retaining ring being resilient to allow deformation, directly engaging said channel in the direction of its resilience and characterized by establishing said preload force with a magnitude that is sufficient to maintain said socket plate and drive plate together without play therebetween and also without distorting said thrust bearing and overstressing the drive plate structure defining said channel.

2. In a wobble plate compressor having a non-rotary socket plate mounted for relative rotation on a rotary drive plate, said drive plate further including a journal, a bushing and a thrust bearing to accommodate the rotary movement between the plates, an improved retainer assembly comprising:

an annular channel formed in said drive plate;

a thrust washer for engaging and holding said bushing against said socket plate; and a dished retaining ring received in said channel and engaging said thrust washer so as to press against said washer and provide a preload force biasing said thrust washer against said journal and said socket plate against said thrust bearing, to thereby reduce noise and provide smoother operation during rotary motion of said drive plate;

said dished retaining ring being resilient to allow deformation, directly engaging said channel in the direction is resilience and characterized by a dished portion extending from an inner peripheral edge of said retaining ring to an outer peripheral edge, a split in said ring, and flat installation ears adjacent said split, said dished portion having an angularity that is decreased on installation to a degree sufficient to establish said preload force with a magnitude that is sufficient to maintain said socket plate and drive plate together without play therebetween as would otherwise result from manufacturing tolerances and dynamic loads and also without distorting said thrust bearing and overstressing the drive plate structure defining said channel.

3. In the compressor as claimed in claim 2, said dished portion of said ring forming an approximately three degree angle with respect to said flat portion when compressed between two flat parallel surfaces with an applied load of about 30 N.

4. In the compressor as claimed in claim 1, said dished retaining ring being characterized by approximately at three degree dish angle when compressed between two flat parallel surfaces with an applied load of about 30 N.

5. In a wobble plate compressor having a non-rotary socket plate mounted for relative rotation on a rotary drive plate, said drive plate further including a journal, a bushing and a thrust bearing to accommodate the relative rotary movement between the plates, an improved retainer assembly comprising:
   a square-edged annular channel formed in said
   a thrust washer for engaging said journal and said bushing for holding against said socket plate; and
   a dished retaining ring being resilient to allow deformation and having square edges received in and directly engaging said channel in the direction of its resilience, and engaging said thrust washer so as to press against said washer and provide a preload force biasing said thrust washer against said journal and said socket plate against said thrust bearing, and with increased frictional retaining force along annular lines of contact with said channel and said washer, to thereby reduce noise and provide smoother operation during rotary motion of said drive plate and to be retained securely in plate.

6. In the compressor as claimed in claim 5, wherein said dished retaining ring is characterized by a dished portion extending from the inner peripheral edge to the outer peripheral edge, said dished portion assuming a substantially flat to relatively small angular condition as installed.

7. In the compressor as claimed in claim 6, said dished portion of said ring forming an approximately three degree angle with respect to said flat portion when compressed between two flat parallel surfaces with an applied load of about 30 N.

8. In the compressor as claimed in claim 5, wherein said dished retaining ring is split and includes a pair of installation ears at each end, said ears being flat extensions beyond the outer peripheral edge of said ring and lying in the plate defined by the annular line of contact with said washer, so as to prevent overstress of said ring under load conditions.

9. In the compressor as claimed in claim 5, wherein said dished retaining ring has a width of between 4.42 and 4.72 and an actual material thickness of between 1.562 and 1.588 mm and an effective thickness due to dishing of between 1.791 and 1.867 mm.

* * * * *